United States Patent [19]
Nagai et al.

[11] 3,908,371
[45] Sept. 30, 1975

[54] APPARATUS FOR SUPPLYING FUEL TO A DUAL-CATALYST EXHAUST TREATMENT SYSTEM

[75] Inventors: Tadashi Nagai; Hitoshi Irikura; Kiminobu Sasa, all of Yokosuka, Japan

[73] Assignee: Nissan Motor Company Limited, Yokohama, Japan

[22] Filed: Nov. 16, 1972

[21] Appl. No.: 307,234

[30] Foreign Application Priority Data
Dec. 29, 1971  Japan.............................. 46-472783

[52] U.S. Cl.................... 60/301; 23/288 F; 60/286; 60/303; 60/900
[51] Int. Cl.² ...................... F01N 3/14; F01N 3/16
[58] Field of Search ............ 60/274, 301, 286, 303, 60/900; 23/288 F; 423/213.5, 213.7

[56] References Cited
UNITED STATES PATENTS

| | | | |
|---|---|---|---|
| 2,674,521 | 4/1954 | Houdry | 60/301 |
| 3,072,457 | 1/1963 | Bloch | 60/295 |
| 3,189,563 | 6/1965 | Hauel | 423/214 |
| 3,228,746 | 1/1966 | Howk | 60/301 |
| 3,389,972 | 6/1968 | Pottharst | 60/299 |
| 3,486,326 | 12/1969 | Hermes | 60/900 |
| 3,599,427 | 8/1971 | Jones | 60/301 |
| 3,637,344 | 1/1971 | Thompson | 60/301 |
| 3,674,423 | 7/1972 | Klimisch | 60/301 |
| 3,696,618 | 10/1972 | Boyd | 60/286 |
| 3,730,157 | 5/1973 | Gerhold | 60/276 |
| 3,732,696 | 5/1973 | Masaki | 60/284 |
| 3,750,632 | 8/1973 | Zechnall | 123/32 EA |
| 3,768,259 | 10/1973 | Carnahan | 60/276 |
| 3,773,894 | 11/1973 | Bernstein | 60/301 |
| 3,791,143 | 2/1974 | Keith | 60/286 |
| 3,809,743 | 5/1974 | Unland | 60/301 |

*Primary Examiner*—Douglas Hart

[57] ABSTRACT

A method of and a system for cleaning exhaust gases from engines of motor vehicles, wherein the exhaust gases are passed through reducing and oxidizing catalysts so that nitrogen oxides are reducing in the reducing catalyst and carbon monoxide and hydrocarbons are oxidized in the oxidizing catalyst. The engines are so arranged as to be operable on a relatively thin mixture which is preferably proportioned to provide an excess-air ratio of about 1.0 to 1.15 so that substantially no carbon monoxide and hydrogen are present in the exhaust gases emitted from the engine. A reducing agent such as hydrocarbons is admixed to the exhaust gases entering the reducing catalyst for removing an excess of oxides and reducing the nitrogen oxides in the exhaust gases while secondary air is supplied to the exhaust gases entering the oxidizing catalyst for assisting in the oxidization of the carbon monoxide and hydrocarbons remaining in the exhaust gases passed through the oxidizing catalyst.

3 Claims, 17 Drawing Figures

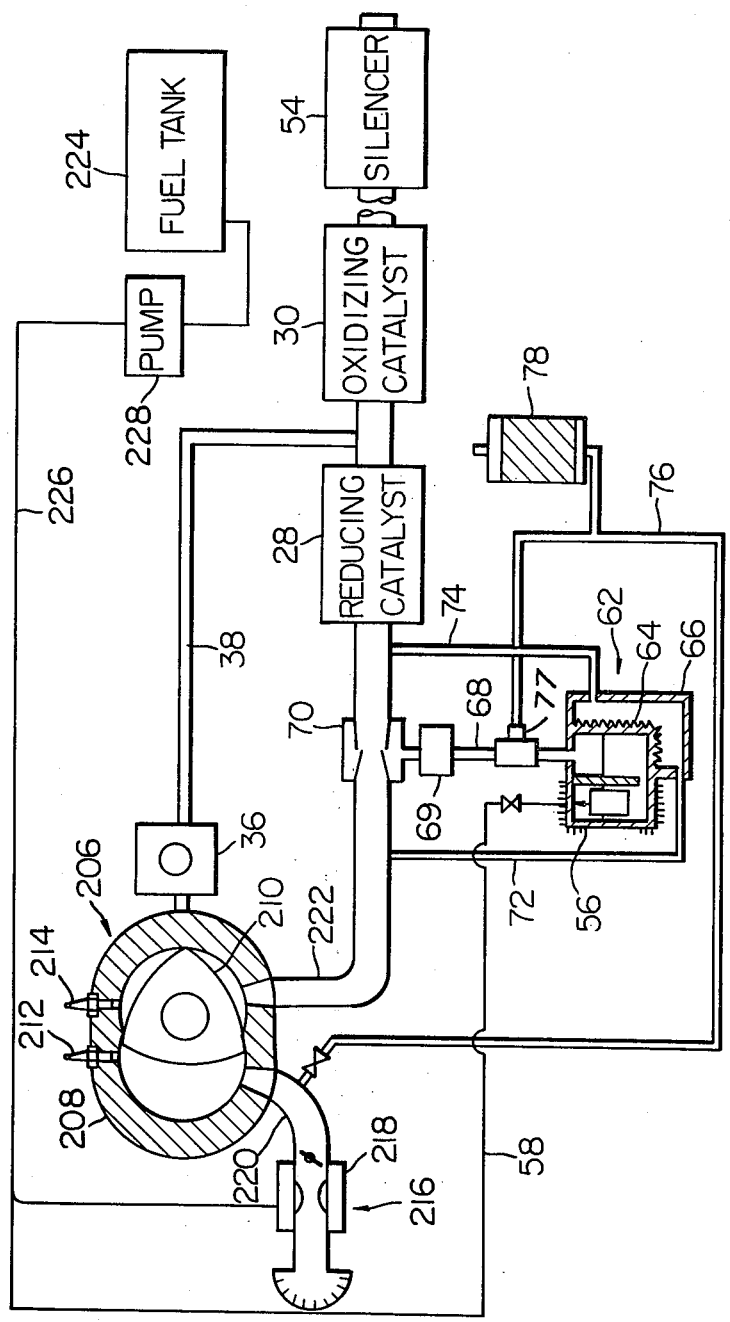

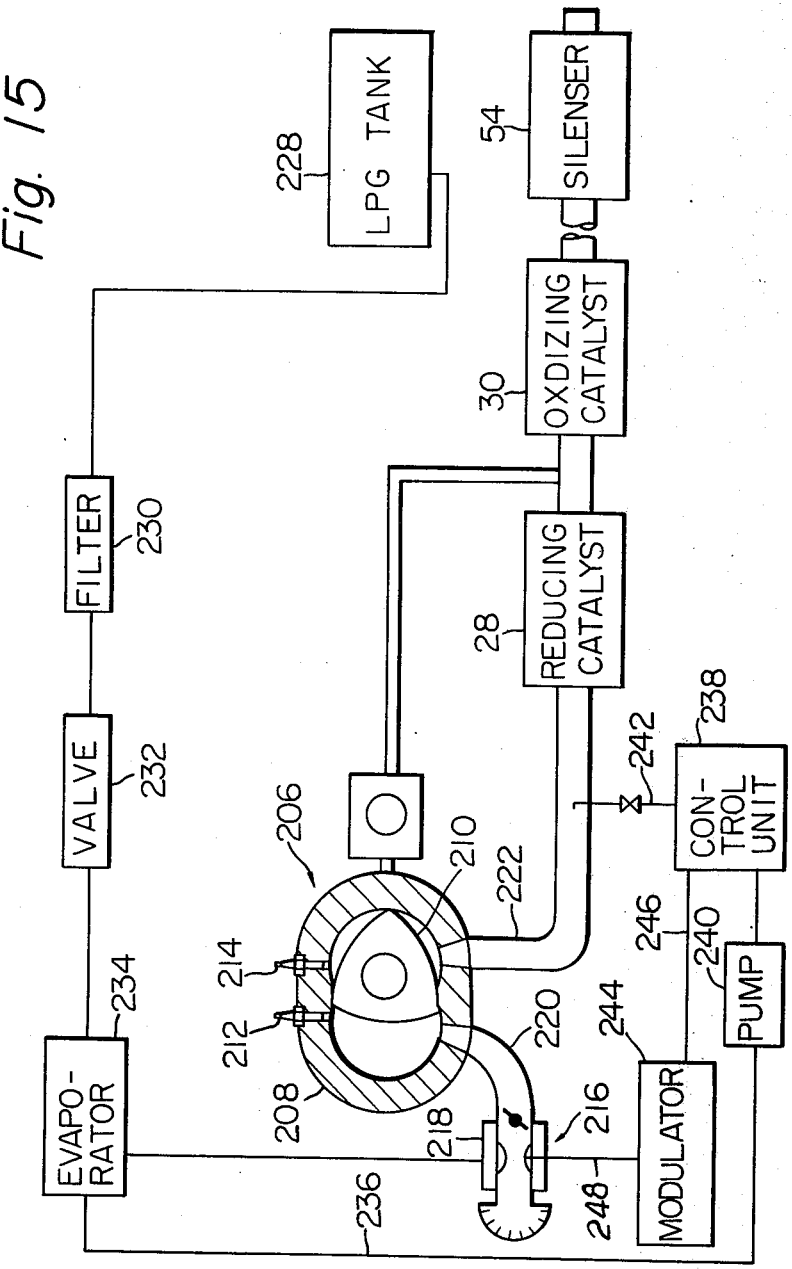

APPARATUS FOR SUPPLYING FUEL TO A DUAL-CATALYST EXHAUST TREATMENT SYSTEM

The present invention relates to engines of motor vehicles and particularly to an air-pollution preventive system for the motor vehicle engines. More particularly, the invention relates to a vehicular exhaust cleaning system of the character which is adapted to chemically eliminate the toxic compounds such as nitrogen oxides, hydrocarbons and carbon monoxide contained in the exhaust gases emitted from the engines of the motor vehicles.

A vehicular exhaust cleaning system has been proposed in which oxidizing and reducing catalysts are positioned in series in an exhaust system of the engine for converting the toxic compounds in the exhaust gases into harmless gases. The reducing reactions take place in the system of this nature in such a manner that the carbon monoxide and hydrocarbons contained in the exhaust gases act to reduce the nitrogen oxides to innoxious nitrogen gases. Since, in this instance, the nitrogen oxides mostly consist of nitrogen monoxide, the reactions proceed as follows:

$$CH_4 + 4NO \rightarrow CO_2 + 2H_2O + 2N_2, \quad \text{Eq. 1}$$

$$CO + NO \rightarrow \tfrac{1}{2}N_2 + CO_2, \quad \text{Eq. 2}$$

wherein the hydrocarbons in the exhaust gases are represented by methane by way of example.

Concurrently as these reactions proceed, ammonia is produced as a result of the existence of the hydrogen in the exhaust gases as follows:

$$2NO + 5H_2 \rightarrow 2NH_3 + 2H_2O. \quad \text{Eq. 3}$$

The hydrogen gas resulting in this reaction is in part the hydrogen which is initially contained in the exhaust emission in a concentration of about one-third of the concentration of the carbon monixide and in part the hydrogen which is produced by the reaction between the moisture and carbon monoxide in the reducing catalyst as follows:

$$CO + H_2O \rightarrow H_2 + CO_2. \quad \text{Eq. 4}$$

Then, the carbon monoxide and hydrocarbons in the exhaust gases are oxidized by the subsequent oxidizing catalyst in the following reactions:

$$CH_4 + 2O_2 \rightarrow CO_2 + 2H_2O, \quad \text{Eq. 5}$$

$$2CO + O_2 \rightarrow 2CO_2. \quad \text{Eq. 6}$$

While the hydrocarbons and carbon monoxide are converted into the harmless compounds by these reactions, the ammonia produced by the reaction of Eq. 3 is simultaneously oxidized so as to produce nitrogen monoxide for a second time, as follows:

$$2NH_3 + 2\tfrac{1}{2}O_2 \rightarrow 2NO + 3H_2O. \quad \text{Eq. 7}$$

Thus, even though the nitrogen monixide is rendered into the harmless nitrogen gas by the action of the reducing catalyst as indicated by Eqs. 1 and 2, ammonia is produced in the presence of the hydrogen or carbon monoxide in the exhaust gases so that the nitrogen monoxide is produced in the oxidizing catalyst. In this manner, the air-pollution preventitive system as a whole fails to completely achieve its goal of eliminating the nitrogen oxides in the exhaust gases.

To prevent production of ammonia, means may be provided by which the hydrogen causing the reaction of Eq. 3 is removed from the exhaust gases flowing anterior to the reducing catalyst. This, however, is practically of no use because of the fact that the hydrogen is inevitably produced as a result of the decomposition of the moisture existing in the exhaust gases as seen in Eq. 4.

The decomposition of the moisture in the exhaust gases can be avoided and accordingly the production of the ammonia can be prevented if, and only if, the carbon monoxide acting to reduce the moisture is removed from or absent in the exhaust gases.

It is, therefore, an important object of the present invention to provide an improved method of substantially completely removing the toxic compounds from the exhaust gases of the motor vehicle engines.

It is another important object to provide an exhaust cleaning system which is adapted to carry out the method.

It is still another important object of the invention to provide an improved vehicular exhaust cleaning system having reducing and oxidizing catalysts which are arranged so that not only the hydrocarbons and carbon monoxide are oxidized to harmless compounds but the nitrogen oxides are completely detoxicated by inhibiting the production of the ammonia that would otherwise be formed in the presence of the hydrogen in the exhaust gases.

Experiments have revealed that only a negligible amount of carbon monoxide and hydrogen are contained in the exhaust gases where a mixture of air and fuel for the engine is proportioned to a ratio which is approximately equal to or higher than a stoichiometric air-to-fuel ratio which is established. Where the mixture has such an air-to-fuel ratio, the nitrogen oxides can not be reduced in the absence of the carbon monoxide and hydrogen in the exhaust gases and, accordingly, it becomes necessary to have a reducing agent supplied to the exhaust system for the reduction of the nitrogen oxides. The present invention thus proposes a method which comprises supplying to the engine an air-fuel mixture which is proportioned to an air-to-fuel ratio in a range between a stoichiometric air-to-fuel ratio and a value appreciably higher than the stoichiometric air-to-fuel ratio, admixing a reducing agent to the exhaust gases emitted from the engine into the exhaust system, passing the resultant mixture of the exhaust gases and the reducing agent through reducing catalyst means for removing an excess of oxygen and reducing nitrogen oxides in the exhaust gases, admixing secondary air to the resultant exhaust gases leaving the reducing catalyst means, and passing the resultant mixture of the exhaust gases and the secondary air through oxidizing catalyst means for oxidizing carbon monoxide and hydrocarbons in the exhaust gases. The exhaust cleaning system which is adapted to put the particular method into practice comprises reducing and oxidizing catalyst means which are positioned in series with each other on the exhaust system of the engine, means to supply a reducing agent to the exhaust system upstream of the reducing catalyst means for removing an excess of oxygen and reducing the nitrogen oxides in the exhaust gases fed to the reducing catalyst means, and means to supply secondary air to the exhaust system posterior to the reducing catalyst means and anterior to the oxidizing catalyst means for oxidizing the hydrocarbons and carbon monoxide remaining in the exhaust gases fed to the oxidizing catalyst means.

The reducing agent used in the system above described may preferably be hydrocarbons. The hydrocarbons may be supplied in the form of vaporized or liquid gasoline or liquefied petroleum gas (LPG). The gasoline or liquefied petroleum gas may be delivered directly or indirectly from the fuel tank for the engine or from a source which is positioned independently of the fuel tank for the engine. The vaporized gasoline may be supplied either by positively vaporizing the liquid gasoline or may utilize the evaporative gas which emerges from a float chamber connected to the fuel tank for the engine. It is, moreover, apparent that the exhaust cleaning system according to the present invention is compatible with any type of motor vehicle engines such as internal combustion engines including reciprocating and Wankel rotary engines and usual diesel engines.

The nature and advantages of the vehicular exhaust cleaning system according to the present invention will become more apparent from the following description taken in conjunction with the accompanying drawings in which like reference numerals and characters designate corresponding parts and units in some figures and in which:

FIG. 9a is a sectional view showing an example of the fuel flow regulator unit for the reducing agent for use in the exhaust cleaning system illustrated in FIG. 9;

FIG. 10a is also a schematic view showing, on an enlarged scale, an example of the nozzle arrangement for use in the exhaust cleaning system illustrated in FIG. 10;

FIG. 14 is a schematic view showing a still further modification of the exhaust cleaning system which is applied to a gasoline-powered rotary type internal combustion engine; and FIG. 15 is a schematic view showing a still further modification of the exhaust cleaning system which is now applied to a rotary type internal combustion engine powered by a liquified petroleum gas.

Figure 1:
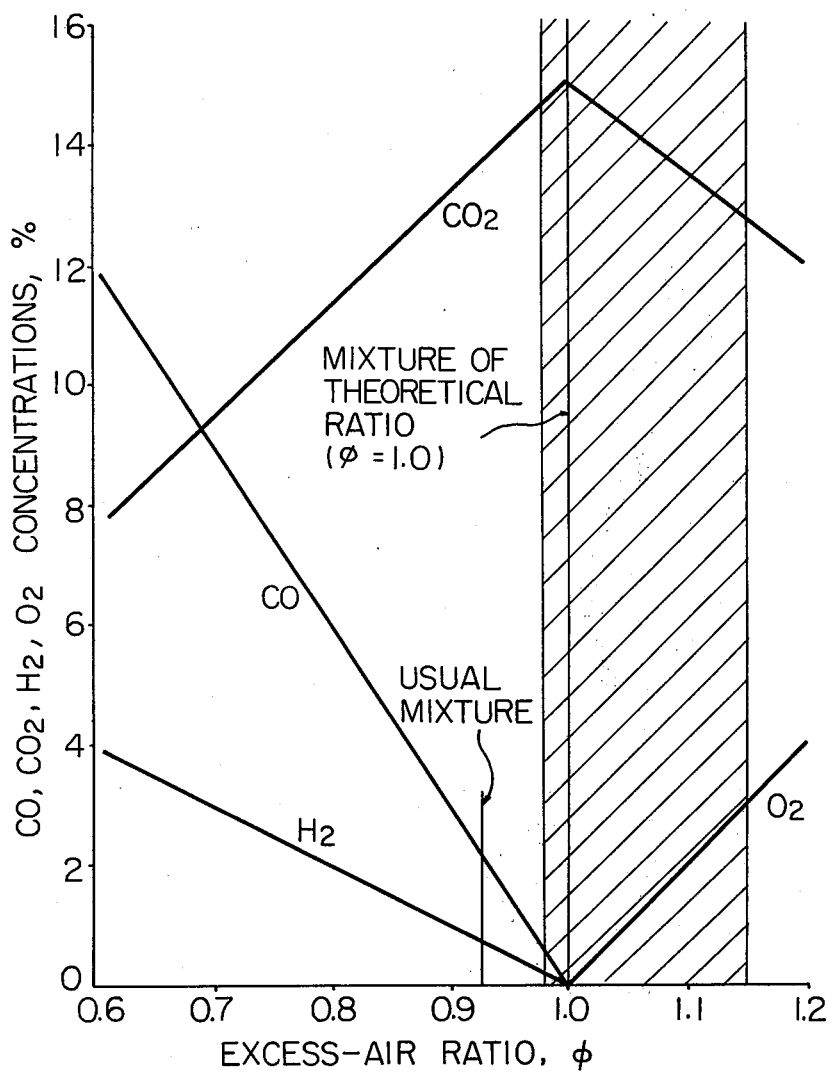
FIG. 1 is a graph indicating proportions in percentage of the carbon monoxide, carbon dioxide, hydrocarbons, hydrogen and oxygen in the exhaust gases when the air-to-fuel ratio of the mixture supplied to the engine is varied.

In FIG. 1, the air-to-fuel ratio of the mixture to be supplied to the engine is indexed by an excess-air ratio $\phi$ which is herein defined as a ratio of the quantity of the air in the air-fuel mixture to the quantity of the mixture having the stoichiometric air-to-fuel ratio. The excess-air ratio $\phi$ is thus 1 when the mixture is proportioned to the stoichiometric air-to-fuel ratio.

Figure 2:
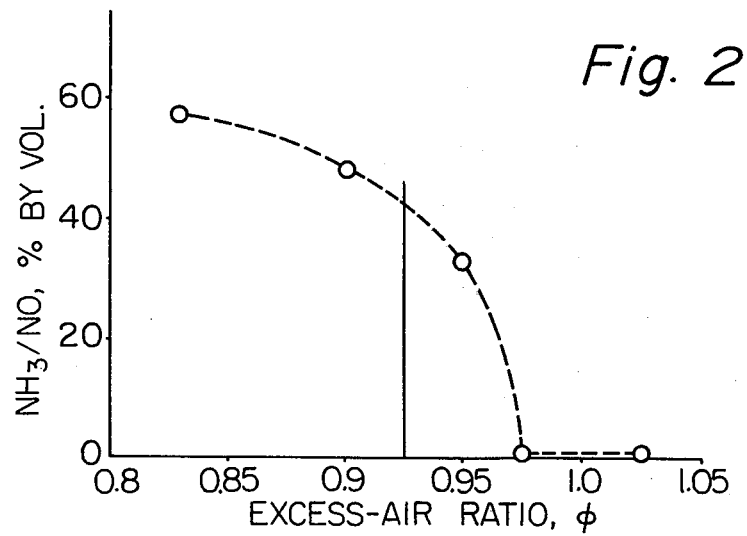
FIG. 2 is a graph indicating the variation of the percentage by volume of the ammonia versus the nitrogen monoxide contained in the exhaust gases at an inlet to the reducing catalyst means of the prior art exhaust cleaning system when the air-to-fuel ratio of the mixture for the engine is varied.
Figure 3:
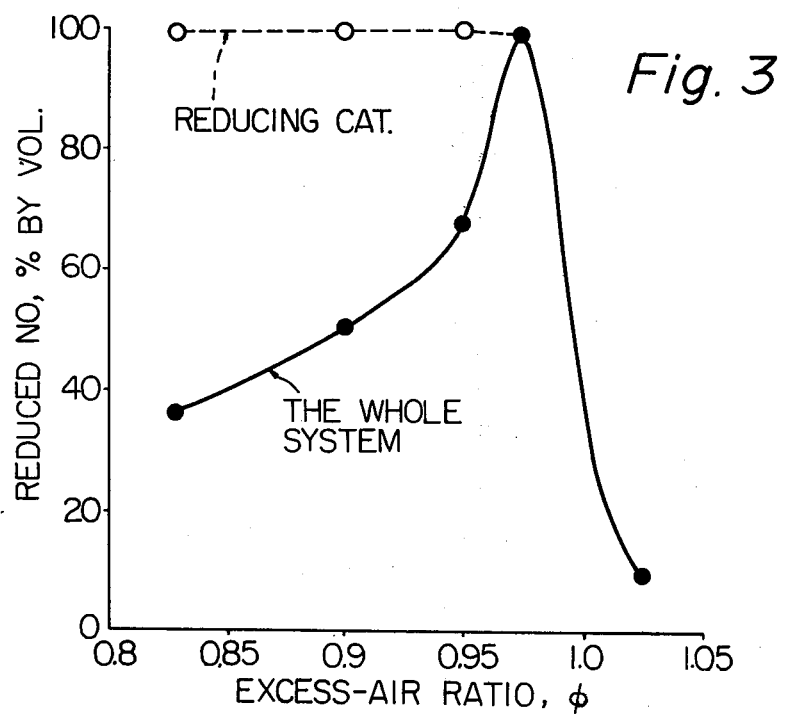
FIG. 3 is a graph indicating the variations of the proportions in percentage of the nitrogen monoxide which is reduced by the prior art system and the reducing catalyst means of the system when the air-to-fuel ratio of the mixture for the engine is varied.

The excess-air ratio $\phi$ in the usual motor vehicle engines is in the neighborhood of 0.92 with which the air-fuel mixture is proportioned to be relatively rich, so that approximately 2 percent of carbon monoxide should be left in the exhaust gases for the reduction of the nitrogen oxides by the reducing catalyst in the exhaust cleaning system of the prior art construction. Where the exhaust cleaning system is arranged in this manner, the proportion of the concentration of the ammonia to the concentration of the nitrogen monoxide increases approximately 40 percent as seen in FIG. 2. In this instance, the nitrogen monoxide in the exhaust gases is reduced approximately 100 percent by the action of the reducing catalyst but, in the entire system, the percentage of the reduced nitrogen monoxide drops to approximately 50 percent, as seen in FIG. 3. Thus, the exhaust cleaning system of the known construction has been unable to completely eliminate the nitrogen monoxide.

The present invention therefore proposes to have the air-fuel mixture proportioned to attain an excess-air ratio $\phi$ of 1.0 to 1.15 as indiciated by a hatched area in the graph of FIG. 1. The excess-air ratio $\phi$ being limited within this particular range, the carbon monoxide and hydrogen are completely oxidized and are thus absent in the exhaust gases as will be understood from FIG. 1. It therefore becomes necessary to have a reducing agent added to the exhaust gases for the purpose of reducing the nitrogen oxides to innoxious compounds before the exhaust gases are fed to the reducing catalyst. A basic arrangement of the exhaust cleaning system to achieve this purpose is illustrated in FIG. 4.

Figure 4:
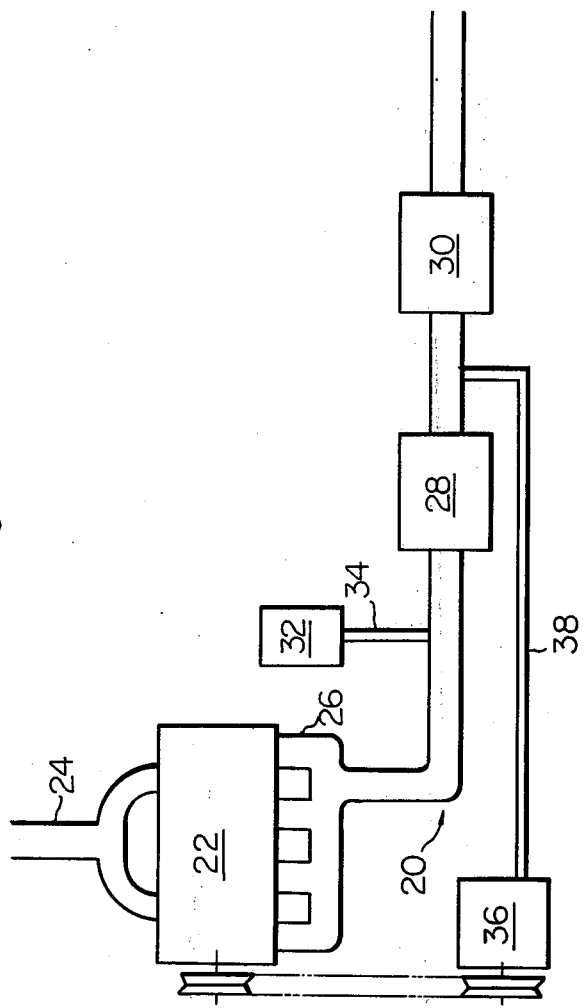
FIG. 4 is a schematic view showing a general arrangement of the exhaust cleaning system according to the present invention.

Referring now to FIG. 4, the exhaust cleaning system according to the present invention is mounted on an exhaust system 20 of an engine 22 of a motor vehicle. The engine 22 is herein shown as a reciprocating type internal combustion engine having a fuel supply unit 24 (which may include a carburetor and an intake manifold) and an exhaust manifold 26.

The exhaust cleaning system comprises reducing and oxidizing catalyst means 28 and 30, respectively, which are mounted in series on the exhaust system. It is, in this instance, important that the reducing catalyst means 28 be positioned upstream of the oxidizing catalyst means 30 as illustrated. A reducing agent supply unit 32 communicates via a pipeline 34 to the exhaust system 20 upstream of the reducing catalyst means 34 while a secondary air supply unit 36 communicates via a pipeline 38 to the exhaust system 20 intermediate between the reducing and oxidizing catalyst means 28 and 30, respectively. This secondary air supply unit 36 usually includes pneumatic pump arrangement which is driven from the engine 22.

Where the fuel supply unit 24 for the engine 22 is of the type using the carburetor, the unit should be preferably so conditioned as to usually deliver an air-fuel mixture with an excess-air ratio of the order of 1.1 to achieve proper driving conditions of the engine during acceleration. If, on the other hand, the engine 22 is of the electronically controlled fuel-injection type in which the fuel is metered to a substantially fixed ratio regardless of the driving conditions of the engine, the fuel supply unit 24 should be conditioned so as to provide an excess-air ratio approximating 1.0 for enabling the engine to operate under proper conditions.

Figure 5:
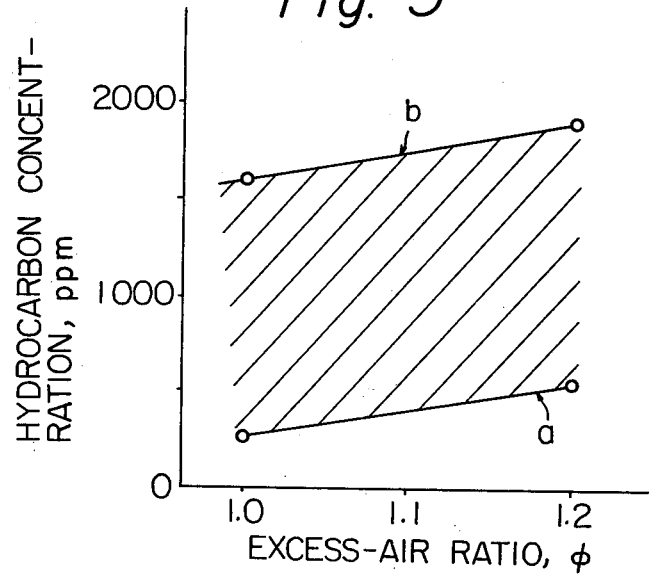
FIG. 5 is a graph indicating a range of the concentration in parts per million of the reducing agent which is represented by hexane) as required to be supplied to the exhaust gases for different air-to-fuel ratios of the mixture supplied to the engine equipped with the system according to the present invention.

With the fuel supply unit 24 conditioned in the manner above described, the concentrations of the carbon monoxide and hydrogen are reduced to practically negligible levels as previously discussed with reference to FIG. 1 with the result that the possibility of the ammonia being produced is reduced remarkably. To remove the substantial amount of oxygen remaining in the exhaust gases entering the reducing catalyst means 28 and to reduce the nitrogen oxides in the exhaust gases, a reducing agent such as for example gasoline or other hydrocarbons in the form of $C_mH_n$ is supplied to the reducing catalyst means 28 from the supply unit 32 through the pipeline 34. The concentration in parts per million of the reducing agent in terms of the excessair ratio $\phi$ should be in a range which is indicated by a hatched area in the graph of FIG. 5, in which the reducing agent is exemplified as hexane ($C_6H_{14}$). As seen in FIG. 5, the range of the concentration of the reducing agent or hydrocarbons to be supplied to the reducing catalyst means has lower and upper limits which are indicated by lines $a$ and $b$, respectively. The lower limit of the range is apparently determined on the basis of the concentrations of the nitrogen oxides and excess oxygen in the exhaust gases, viz., from the relations of the reactions in which the oxygen in the excess air and the nitrogen oxides in the exhaust gases entering the reducing catalyst 28 are reduced as follows:

  Eq. 8

  Eq. 9

The upper limit of the concentrations of the reducing agent in terms of the excess-air ratio of the air-fuel mixture should be determined in a manner to preclude production of the carbon monoxide within the entire system. From FIG. 5, it is apparent that satisfactory results can be achieved where the air-fuel mixture for the engine is proportioned to provide an excess-air ratio of 1.2, if the reducing agent or hydrocarbons are supplied to the reducing catalyst 28 means in a concentration of the order of 500 parts per million (or 0.05% by volume).

Figure 6:
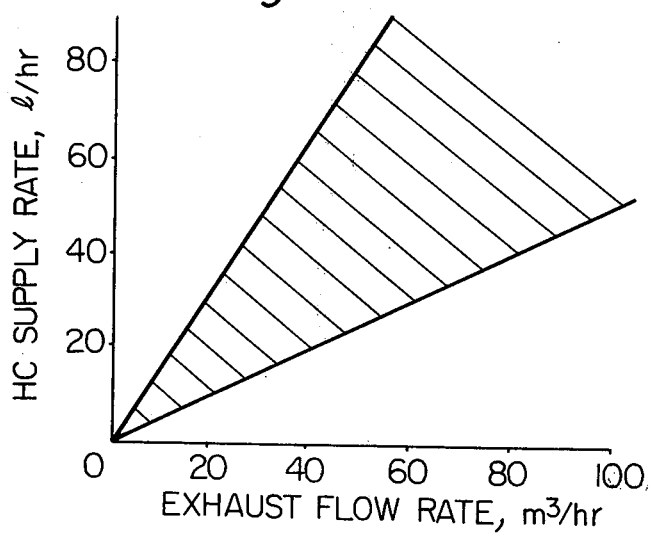
FIG. 6 is a graph indicating a range of the proportion between the rates per hour of the flow of the exhaust gases and the reducing agent or hexane to be supplied thereto.

The ratio of the rate of supply (in liter per hour) of the reducing agent (exemplified as hexane) to be supplied to the reducing catalyst 28 means in the thus determined concentration versus the rate of flow (in cubic meter per hour) of the exhaust gases through the reducing catalyst means 28 should be in a range which is indicated by a hatched area in the graph of FIG. 6. From FIG. 6, it is apparent that the rate of supply of the reducing agent should be generally proportional to the rate of flow of the exhaust gases with which the reducing agent is to be mixed.

The reducing agent or hydrocarbons remaining in the exhaust gases leaving the reducing catalyst means 28, viz., left unconsumed in the reaction of Eq. 9 are oxidized in the subsequent oxidizing catalyst means 30 to which secondary air is supplied at a controlled rate from the secondary air supply unit 36 via the pipeline 38 (FIG. 4). The exhaust gases are in this manner completely cleared of the air-contaminants such as the carbon monoxide, hydrocarbons and nitrogen oxides. In this instance, it might be feared lest a substantial amount of ammonia is produced as a result of the reaction between the nitrogen oxides and the hydrocarbons as the reducing agent as follows:

  Eq. 10

It is, however, pointed out that such reaction between the nitrogen oxide and hydrocarbons practically need not be taken into account because of the extremely small concentration of the reducing agent or hydrocarbons in the exhaust gases and because of the far lower velocity of the reaction of Eq. 10 than the velocities of the reaction of Eqs. 8 and 9.

It will thus be appreciated from the foregoing description that the exhaust cleaning system according to the present invention is well compatible with any type of existing reducing catalyst for the purpose of removing the toxic nitrogen oxides from the exhaust gases at a remarkably increased efficiency.

FIGS. 7 to 15 illustrate various modifications of the exhaust cleaning system of the general construction shown in FIG. 4.

Figure 7:
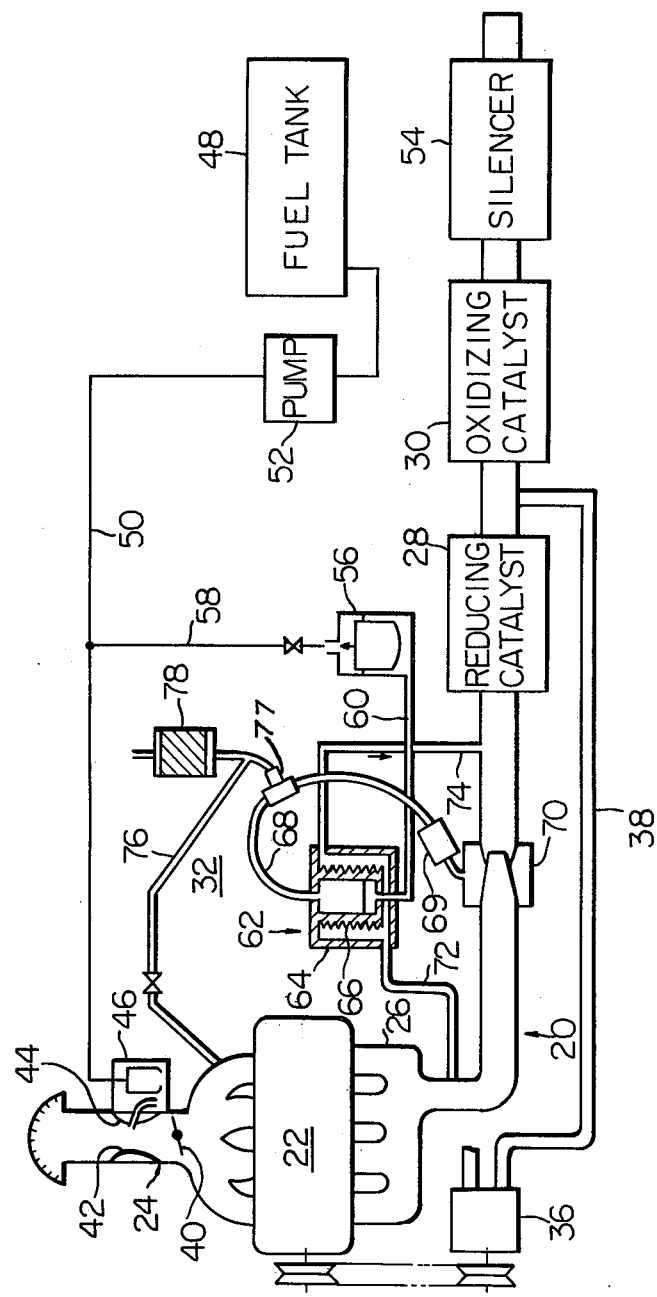
FIG. 7 is a schematic view showing a modification of the exhaust cleaning system according to the present invention as applied to a gasoline-powered reciprocating type internal combustion engine.

Referring first to FIG. 7, the exhaust cleaning ventive system is illustrated as used on a gasoline powered internal combustion engine 22. The internal combustion engine 22 is combined with a fuel supply unit 24 which includes a carburetor comprising a throttle valve 40, a venturi 42 and a fuel nozzle 44 leading from a float bowl 46. The float bowl 46 receives gasoline from a fuel tank 48 through a pipeline 50 in which a fuel feed pump 52 is interposed as customary. The engine 22 is further combined with an exhaust system 20 including an exhaust manifold 26 and a silencer 54.

As previously described, the exhaust cleaning system according to the present invention includes the reducing and oxidizing catalyst means 28 and 30, respectively, which are incorporated in the exhaust system 20 and which are respectively associated with the reducing agent supply unit 32 and the secondary air supply unit 36. The reducing agent supply unit 32 of the embodiment of the exhaust cleaning system herein shown is so constructed as to supply gasoline as the reducing agent to the exhaust system 20 upstream of the reducing catalyst means 28 from the fuel tank 48 for the engine 22. To achieve this end, the reducing agent supply unit 32 comprises suitable fuel storage means such as a float chamber 56 having an inlet which communicates through a valved pipeline 58 with the pipeline 50 and fuel feed pump 52. If desired, the float chamber 56 may be in direct communication with the fuel feed pump 52. The float chamber 56 has an outlet which is in communication through a pipeline 60 with a gasoline evaporator unit 62 adapted to vaporize the liquid gasoline from the float chamber 56 and to supply the vaporized gasoline to the exhaust system 20 upstream of the reducing catalyst means 28. The gasoline evaporator unit 62, which may be constructed in any desired manner insofar as the above mentioned function can be achieved, is herein shown by way of example as comprising spaced outer and inner vessels 64 and 66, respectively, defining an annular heating chamber (not numbered) therebetween. The inner vessel 66 has a bottom inlet port which communicates with the pipeline 60 leading from the float chamber 56 and a top outlet port which communicates with a vaporized fuel supply pipeline 68 incorporating a flow shut-off valve 69. The varporized fuel supply pipeline 68 thus leading from the chamber in the inner vessel 66 of the evaporator unit 62 is opened into a venturi of constriction 70 which is located in the exhaust system 20 upstream of the reducing catalyst means 28 as shown. The annular chamber formed between the outer and inner vessels 64 and 66, respectively, has an inlet port which is in communication with the exhaust manifold 26 or any part of the exhaust system 20 upstream of the venturi 70 through an exhaust gas supply pipeline 72 and an outlet port which is in communication with the exhaust system 20 intervening between the venturi 70 and reducing catalyst means 28 through an exhaust discharge pipeline 74 as illustrated.

With the construction of the exhaust cleaning system above described, the gasoline constantly fed to the float chamber 56 from the fuel tank 48 through the pipeline 50 and 58 is relayed to the chamber in the inner vessel 66 of the gasoline evaporator unit 62 is therein heated by the hot exhaust gases delivered to the annular chamber between the outer and inner vessels 62 and 66, respectively, through the exhaust gas supply pipeline 72 during operation of the system. The gasoline thus heated and vaporized in the inner vessel 66 is passed over the venturi 70 through the vaporized fuel supply pipeline 68. The exhaust gases in the annular chamber between the vessels 62 and 64 is recirculated to the exhaust system 20 upstream of the reducing catalyst means 28.

To regulate the rate of flow of the vaporized gasoline through the vaporized fuel supply pipeline 68 may be in communication with the atmosphere through a discharge pipe (no numeral) which has a pressure relief valve 77 at one end thereof. The pressure relief valve 77 is operative to prevent an unusual rise of the pressure of the vaporized gasoline to be fed to the venturi 70. The discharge pipe, moreover, may be connected to a carbon canister 78 which absorb the vaporized gasoline for preventing it to escape to the atmosphere. The discharge pipe may be branched to the intake manifold of the engine 22 or any part of the fuel supply unit 24 through a pipe line 76 having a valve (no numeral) which is opened by the intake manifold vacuum. Through the pipe line 76, the absorbed gasoline vapor is sucked into the intake manifold when the engine 22 is operated.

Figure 8:
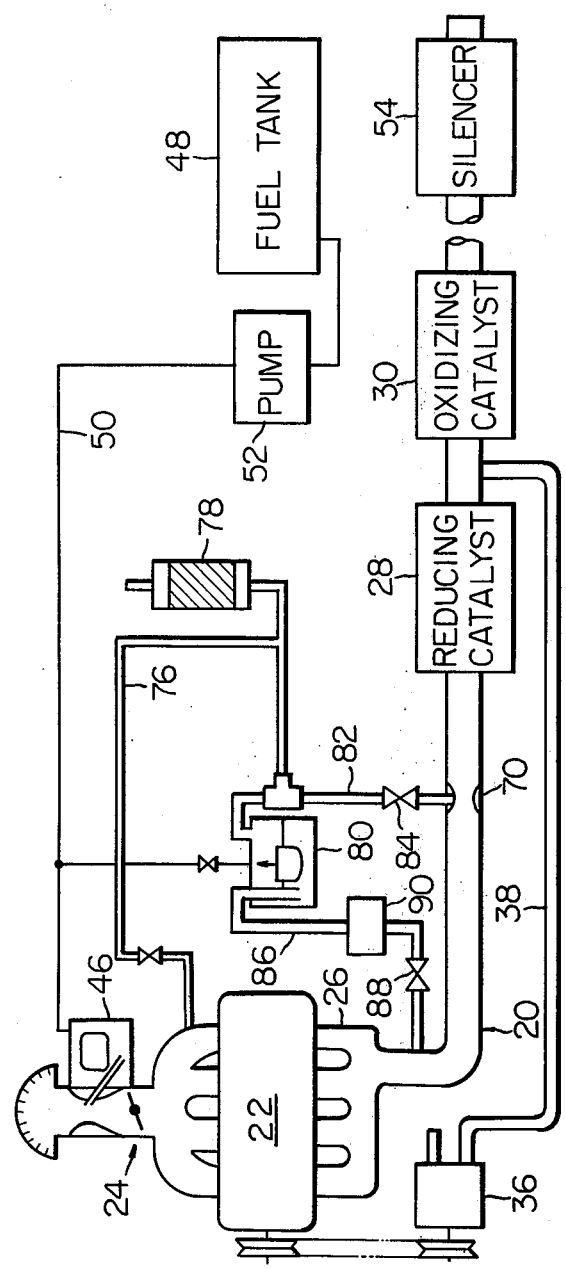
FIG. 8 is a schematic view showing another modification of the exhaust cleaning system applied to the gasoline-powered reciprocating type internal combustion engine.

FIG. 8 illustrates another preferred embodiment of the exhaust cleaning system according to the present invention in which the reducing agent supply unit is adapted to produce the vaporized gasoline which is evaporated by the vapor pressure of the gasoline. Thus, the reducing agent supply unit comprises a gasoline evaporator/float chamber 80 having a fuel inlet port which is in communication with the fuel supply pipeline 50 and a vaporized fuel supply pipeline 82 having a flow control valve 84 and opened at its leading end into the constriction or venturi 70 in the exhaust system 20 upstream of the reducing catalyst means 28. The vaporized fuel supply pipeline 80 is herein shown as also communicating with the float bowl 46 of the carburetor through a valved pipeline 76 and with a canister 78. The liquid gasoline thus fed to the gasoline line evaporator/float chamber 80 is heated and evaporated through transfer of the heat of the hot exhaust gases which are drawn from the exhaust manifold 26 of the engine 22 through an exhaust gas supply pipeline 66 incorporating a flow control valve 88 and a filter 90. The exhaust gas supply pipeline 86 is opened at its leading end into the evaporator/float chamber 80 feeds the hot exhaust gases directly into the liquid gasoline which is stored in the evaporator/float chamber during operation. The liquid gasoline is consequently evaporated and is passed to the venturi 70 together with the waste exhaust gases discharged from the evaporator/float chamber 80.

Figure 9:
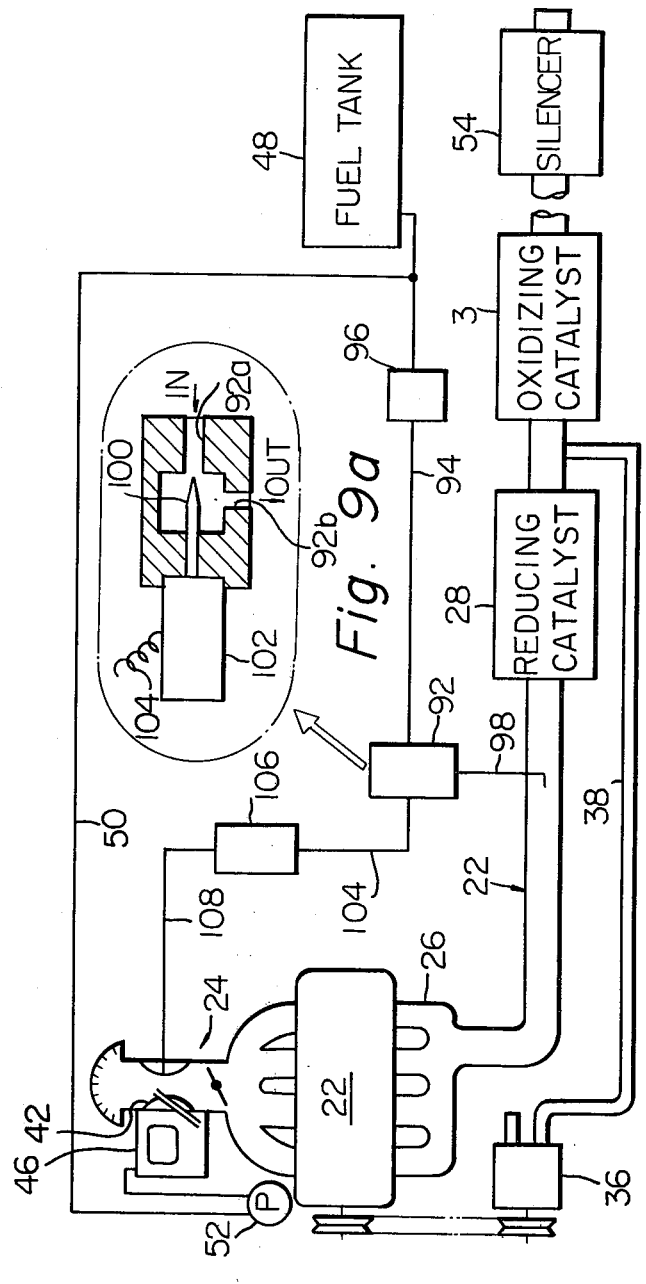
FIG. 9 is a schematic view showing still another modification of the exhaust cleaning system applied to the gasoline-powered reciprocating type internal combustion engine.

FIGS. 9 and 9a illustrate still another preferred embodiment of the exhaust cleaning system which is applied to the gasoline powered internal combustion engine. The system herein shown thus comprises a reducing agent supply unit which is adapted to supply liquid gasoline to the exhaust system upstream of the reducing catalyst means at a rate which is regulated in accordance with the levels of the vacuum in the venturi 42 of the carburetor for the engine 22. The reducing agent supply unit of this nature comprises a solenoid operated fuel flow regulator valve 92 having an inlet port 92a communicating with the fuel tank 48 for the engine 22 through a fuel supply pipeline 94 having a fuel feed pump 96 incorporated therein and an outlet port 92b communicating with the exhaust system 20 upstream of the reducing catalyst means 28 through a pipeline 98. A valve element 99, which is herein shown as being in the form of a needle valve element, is aligned with the inlet port 92a of the valve 92 and is movable in a manner to vary the rate of flow of the fuel or gasoline through the inlet port 92a. The valve element 100 is operatively connected to a plunger (not shown) of a solenoid device 102 having a solenoid coil 104 connected to a vacuum responsive modulator arrangement 106. The modulator arrangement 106 is connected to the venturi 42 of the carburetor through a passageway 108 so that the vacuum obtaining in the carburetor venturi 42 is at all times drawn to the modulator arrangement 106 during operation. The modulator arrangement 106 thus responds to the vacuum from the venturi 42 and actuates the solenoid device 102 is accordance with the levels of the vacuum. This causes the valve element 100 to be moved through the inlet port 92a of the fuel flow regulator valve 92 so that the rate of flow of the gasoline through the regulator valve is controlled in accordance with the vacuum in the carburetor venturi 42. The liquid gasoline thus fed into the exhaust system dispersed in the exhaust gases entering the reducing catalyst means 28.

Where desired, the valve element 100 of the fuel flow regulator valve 92 may be driven by means of a suitable diaphragm arrangement which is responsive to the vacuum drawn directly or through a suitable modulator from the carburetor venturi 42 and acting upon a diaphragm forming part of the arrangement so that the flow rate of the gasoline through the regulator valve 92 is continuously regulated in accordance with the vacuum levels at the carburetor venturi, thereby achieving the end effect which is similar to that resulting from the use of the solenoid operated valve.

Figure 10:
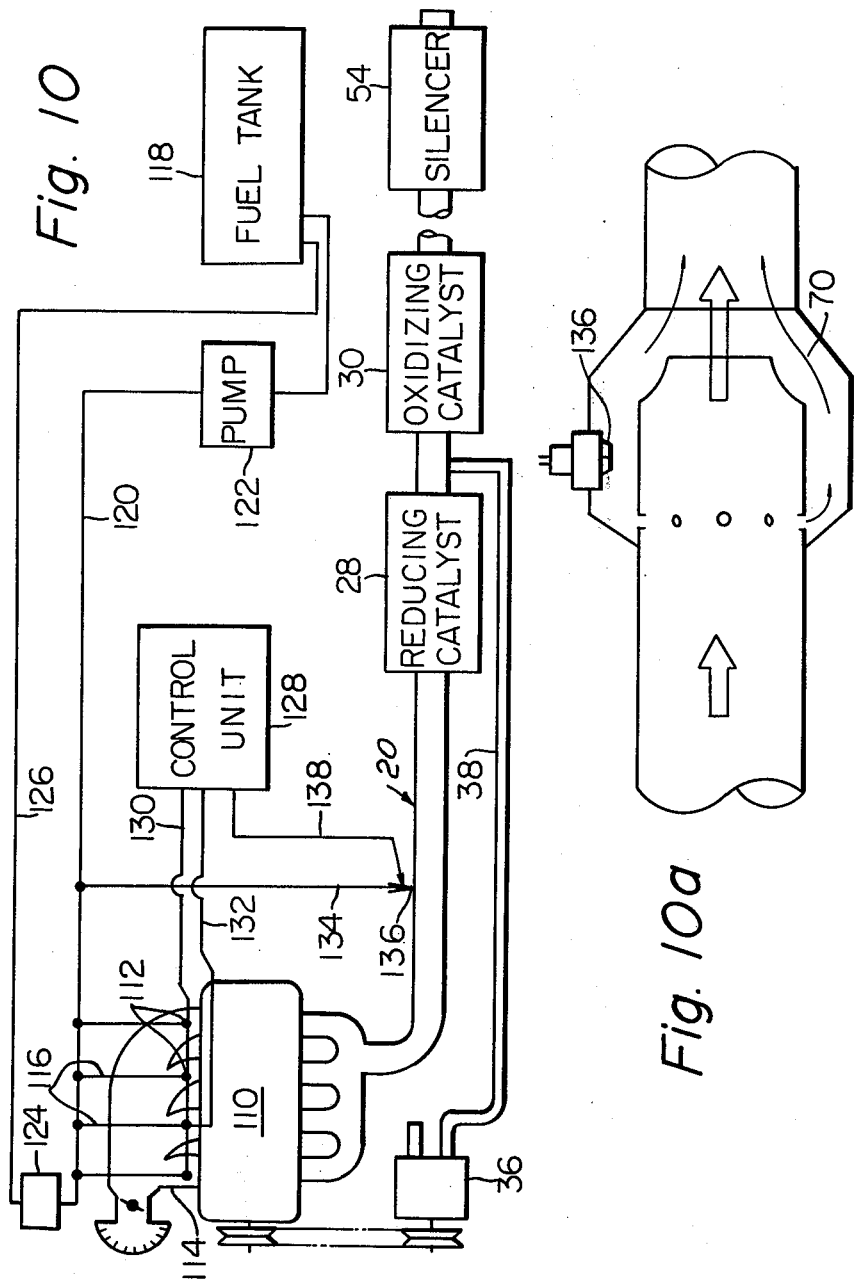
FIG. 10 is a schematic view showing a further modification of the exhaust cleaning system according to the present invention, the system being applied to an electronic fuel-injection engine.

Still another preferred embodiment of the exhaust cleaning system according to the present invention is shown in FIGS. 10 and 10a. The exhaust cleaning system herein shown is adapted for use with an electronically controlled fuel injection engine which is designated generally by reference numeral 10. The fuel injection engine 110 includes as customary fuel injection nozzles 112 opened into intake manifolds 114 of the engine and connected to fuel distribution pipes 116. The fuel distribution pipes 116 communicate with a fuel tank 118 through a fuel supply pipeline 120 having a fuel feed pump 122. The pressure of the fuel to be fed from the fuel distribution pipes 116 to the injection nozzles 114 is regulated by a pressure regulator 124 intervening between the distribution pipes 116 and the fuel tank 118 through a pipeline 126. The amount of fuel injected into the intake manifold 114 from each of the fuel injection nozzles 112 and the ignition timing in the engine 110 are determined by a number of sensors (not shown) which send electrical signals to a transistorized control unit 128 which is connected to the injection nozzles 112 and an ignition distributor (not shown) through electric lines 130 and 132, respectively. The more details of the construction and operation of the described fuel injection engine are well known in the art and thus no further description will be herein incorporated.

The fuel injection engine of the above described general construction is combined in accordance with the present invention with an exhaust cleaning system which includes the reducing and oxidizing catalyst means 28 and 30, respectively, mounted on the exhaust system 20 of the engine 110 and the secondary air supply unit 36 terminating intermediate between the catalyst means 28 and 30 as previously described. The unit to supply the reducing means to the exhaust system 20 upstream of the reducing catalyst means 28 is constituted in the shown construction by a pipeline 134 which is branched from the fuel supply pipeline 120 intervening between the fuel distribution pipes 114 and fuel feed pump 122. This branch pipeline 134 terminates in a nozzle 136 which is opened into a venturi 70 of the exhaust system 20 anterior to the reducing catalyst means 28. The nozzle 136 is controlled from the electronic control unit 128 through an electric line 138. The fuel, which may usually be liquid gasoline, thus spurted into the exhaust system 20 from the nozzle 136 at a rate regulated by the control unit 128 is admixed to the exhaust gases and supplied to the reducing catalyst means 28 for thereby achieving the desired end effect which was previously described.

It is, in this instance, apparent that any of the constructions of the embodiments illustrated in FIGS. 7 to 9 is applicable to the fuel injection engine of the described nature through minor modifications. Whichsoever construction the exhaust cleaning system for such engine may have, it is of importance that the engine be so arranged as to deliver an air-fuel mixture having an excess-air ratio of about 1.0 because the fuel is usually metered to a substantially fixed ratio irrespective of the driving conditions of the engine. Where the exhaust cleaning system of any construction previously described is used on the internal combustion engine having the carburetor in lieu of the fuel injection nozzles, the air-fuel mixture should be proportioned to achieve an excess-air ratio of about 1.1 to cope with the driving conditions of the engine during acceleration, as previously mentioned.

Figure 11:
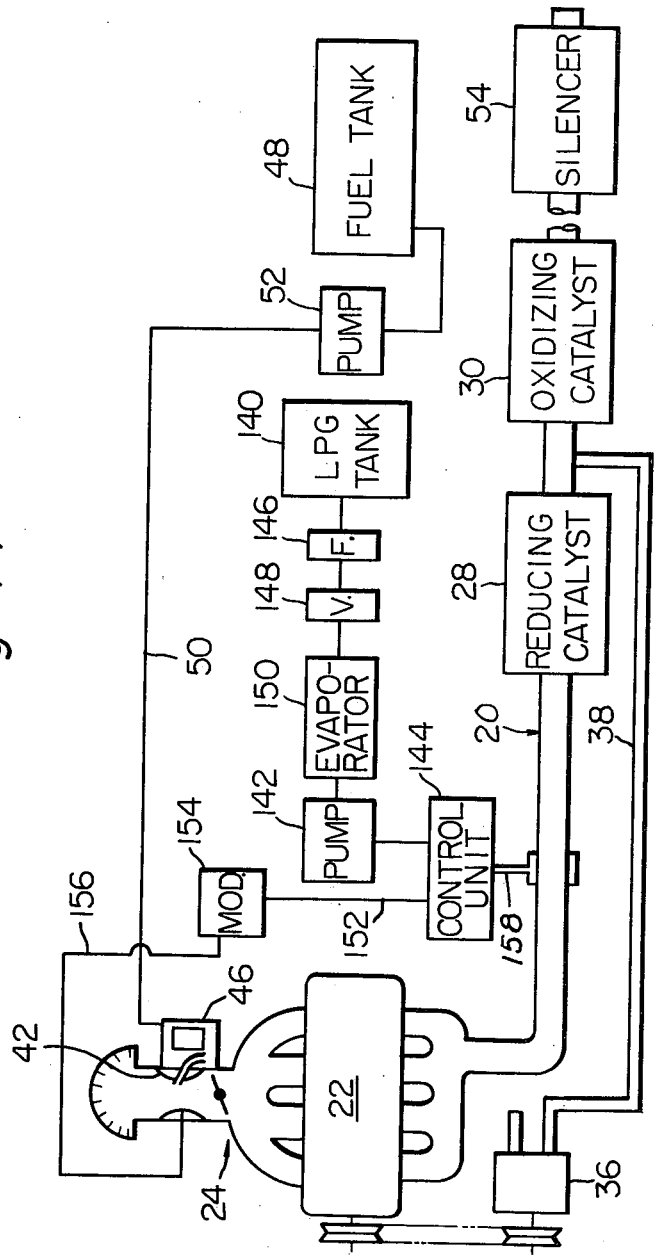
FIG. 11 is a schematic view showing a further modification of the exhaust cleaning system according to the present invention as applied to the gasoline-powered reciprocating type internal combustion engine.

FIG. 11 illustrates still another preferred embodiment of the exhaust cleaning system according to the present invention, the system now being adapted for use with a gasoline powered internal combustion engine 22 of the type using a carburetor. The engine 22 is thus supplied with gasoline from a fuel tank 48 through a fuel supply pipeline 50 having a fuel feed pump 52 and opened into a float bowl 46. The exhaust cleaning system combined with this engine arrangement has a reducing agent supply unit which now includes a tank 140 storing a liquified petroleum gas (LPG) as the reducing agent for the exhaust gases. The liquefied petroleum gas in the tank 140 is fed by a pump 142 to a flow control unit 144 through a filter 146, a flow shut-off valve 148 and an evaporator 150. The flow control unit 144. The flow control unit 144 is constructed essentially similarly to the assembly of the flow regulator valve 92 and solenoid device 102 of the system shown in FIGS. 9 and 9a. The flow control unit 144 is connected through an electric line 152 to a modulator arrangement 154 which is responsive to the vacuum in the venturi 42 of the fuel supply unit 24 of the engine 22 through a passageway 156 for drawing the vacuum from the venturi 42 to the modulator arrangement 154. If desired, the control unit 144 may be so constructed as to be directly acted upon by the venturi vacuum which is modulated in the modulator arrangement. The flow control unit 144 thus constructed in any desired manner has an outlet port (not shown) which is in communication with the exhaust system 20 upstream of the reducing catalyst means 28 through a pipeline 158. During operation in which the flow shut-off valve 148 is open and in which vacuums obtain in the carburetor venturi 42, the liquified petroleum gas stored in the tank 140 is passed through the filter 146 and fed to the evaporator 150 by pump 142. The evaporated propane gas thus supplied from the evaporator 150 is fed to the flow control unit 144 and further to the exhaust system upstream of the reducing catalyst means 28 at a rate which is regulated by the modulator arrangement 154 in accordance with the levels of the vacuum at the venturi 42 of the carburetor.

Figure 12:
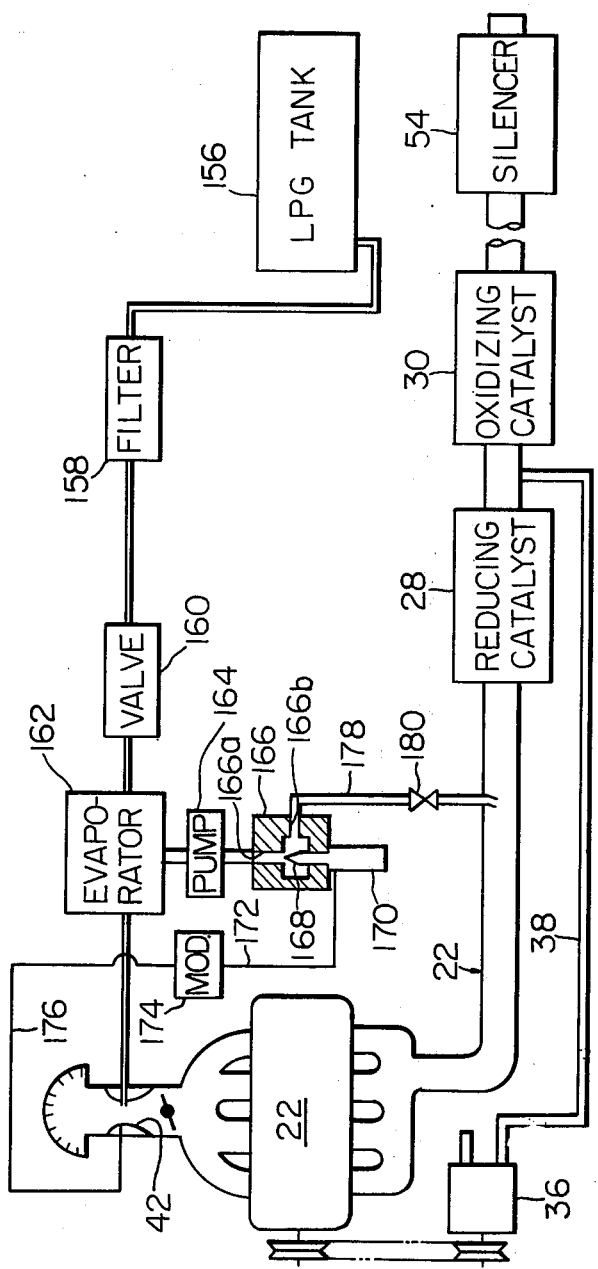
FIG. 12 is a schematic view showing a further modification of the exhaust cleaning system which is now applied to a reciprocating type internal combustion engine powered by a liquefied petroleum gas.

FIG. 12 illustrates still another preferred embodiment of the exhaust cleaning system according to the present invention, in which the system is now combined with an internal combustion engine 22 which is powered by a liquefied petroleum gas as in the case of taxicabs. The LPG powered internal engine 22 thus receives fuel from a tank 156 storing the liquefied petroleum gas (LPG). The LPG tank 156 supplies the liquefied propane gas is supplied to the carburetor venturi 42 through a filter 158, a flow shut-off valve 160 and an evaporator 162 is customary. The exhaust cleaning system in combination with such engine 22 includes a pump 164 which is connected to the evaporator 162 to pump the evaporated petroleum gas off the evaporator. The pump 164 feeds the evaporated propane gas to a flow regulator valve 166 which is similar to the valve 92 in the system shown in FIGS. 9 and 9a. The flow regulator valve 166 thus has a valve element 168 which is movable into and out of an inlet port 166a of the valve 166 by a solenoid device 170. This solenoid 170 is connected to an electric line 172 to a modulator arrangement 174 which is responsive to the vacuums in the venturi 42 of the carburetor through a vacuum passageway. As previously described, the flow regulator valve and modulator arrangement 174 may be replaced with a diaphragm arrangement by which the vacuum drawn from the carburetor venturi 42 acts directly or through modulation upon a diaphragm operated valve. The flow regulator valve 166 of any of the constructions above mentioned has an outlet port 166b which is in communication with the exhaust system 20 upstream of the reducing catalyst means 28 through a pipeline 178 in which a flow shut-off valve 18 may be incorporated by preference.

Figure 13:
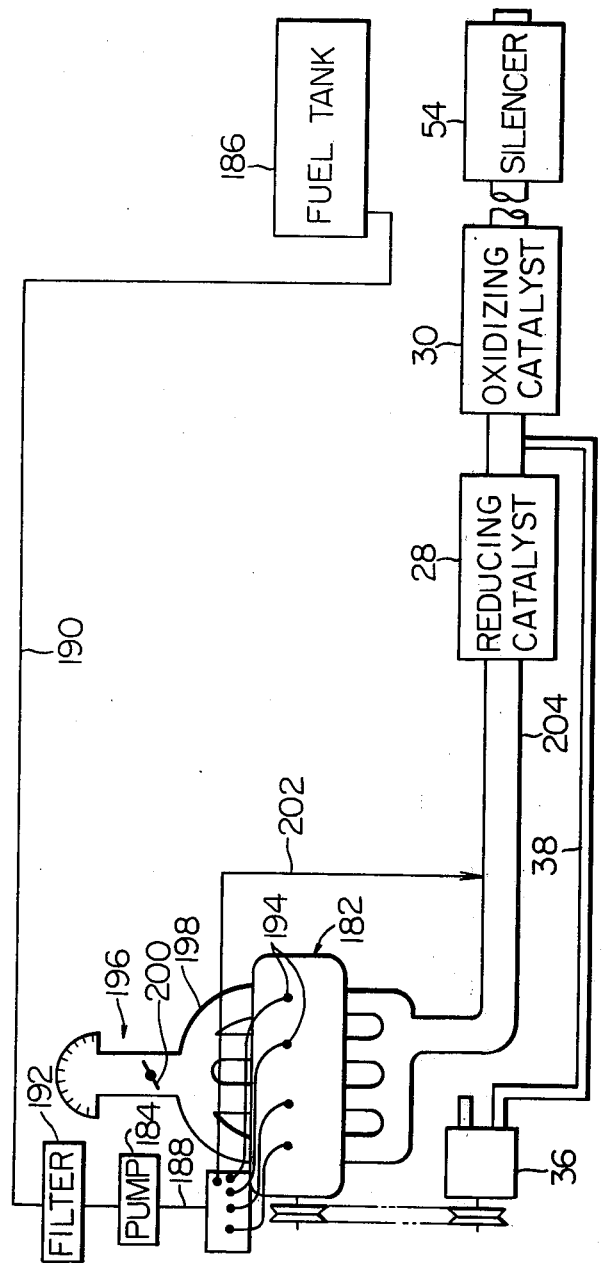
FIG. 13 is a schematic view showing a still further modification of the exhaust cleaning system according to the present invention, the system being applied to a diesel engine.

FIG. 13 illustrates still another embodiment of the exhaust cleaning system according to the present invention, the system being now adapted to be combined with a diesel engine in which the combustion of the air-fuel mixture is effected by compression ignition of the mixture in the combustion chambers. The diesel engine, designated generally by reference numeral 182, is thus provided with a fuel oil pump 184 delivering a fuel oil from a fuel tank 186 to a fuel oil distributor 188 through a pipeline 190 and a fuel oil filter 192. The fuel oil is distributed to fuel injection nozzles 194 and sprayed into associated cylinders (not shown) of the engine 182. Air is also fed to the cylinders through an air intake unit 196 having a ram manifold 198 and is compressed therein by the movement of the pistons. The diesel engines generally operate on mixtures having relatively high excess-air ratios and under broad driving conditions, thus making it difficult to control the air-to-fuel ratio of the mixture for converting an oxidizing atmosphere into a reducing atmosphere. In accordance with the present invention, therefore, the air intake unit 196 is provided with an intake air flow control valve 200 which is located anterior to the ram manifold 198 as illustrated. This intake air flow control valve 200 is linked with an accelerator pedal (not shown) of the motor vehicle and is thereby driven to regulate the rate of flow of the air to be passed to the ram manifold 198 in a manner to proportion the mixture to a substantially constant air-to-fuel ratio, preferably to a ratio providing an excess-air ratio of a range of from 1.2 to 1.5 approximating the smoke limit. At the same time, a pipeline 202 provides constant communication between the fuel oil distributor 188 and an exhaust system 204 upstream of the reducing catalyst means 28 which was previously described.

FIGS. 14 and 15 illustrate embodiments of the exhaust cleaning system according to the present invention as applied to Wankel type rotary engines. The Wankel type rotary engine designated generally by reference numeral 206 is made up of a rotor housing 208 defining therein an epitrochoidal chamber and a three-lobed rotor 210 which revolves eccentrically around a shaft (not shown) in the epitrochoidal chamber. Trailing and leading ignition plugs 212 and 214, respectively, extend into the chamber in the rotor housing 208 for firing the air-fuel mixture in the chamber. A fuel supply unit 216 having a usual carburetor 218 has an intake manifold 220 which is opened at its leading end into the chamber in the rotor housing 208. An exhaust system 222 leads from the chamber in the rotor housing 208. The construction and operation of the Wankel type rotary engine of the nature above described are well known in the art and as such no further description thereof may be herein incorporated.

The rotary engine illustrated in FIG. 14 is of the type which operates on gasoline which is delivered to the carburetor 218 from a fuel tank 224 through a fuel supply pipeline 226 by a fuel feed pump 228 incorporated in the pipeline 226.

In accordance with the present invention, the exhaust system 222 is provided with the reducing and oxidizing catalyst means 28 and 30 and the secondary air supply unit 36 communicating through the pipeline 38 with the exhaust system 222 intervening between the catalyst means 28 and 30, similarly to the embodiments of the exhaust cleaning system thus far described. The exhaust cleaning system further includes a reducing agent supply unit which is constructed entirely similarly to its counterpart of the system shown in FIG. 7 for thereby supplying vaporized gasoline to the exhaust system 222 upstream of the reducing catalyst means 28. The reducing agent supply unit thus comprises a float chamber 56 having an inlet communicating with the fuel supply pipeline 226 through a valved pipeline 58 and an outlet communicating with a gasoline evaporator 62 located adjacent the float chamber 56. The evaporator 62 includes chambers 64 and 66 which are in contact with each other. The chamber communicates through a pipeline 68 with a constriction or venturi 70 which is formed on the exhaust system 222 upstream of the reducing catalyst means 28. The chamber 64, on the other hand, includes inlet and outlet ports which are in communication through pipelines 72 and 74 with the exhaust system 222 upstream and downstream, respectively, of the venturi 70 so that the hot exhaust gases drawn into the chamber 66 heats the adjacent chamber 64 for vaporizing the liquid gasoline therein and is discharged from the chamber 66 to the exhaust system 222 through the pipeline 74. The vaporized gasoline thus produced is fed to the venturi 70 in the exhaust system 222 through the pipeline 68. The exhaust cleaning system is herein shown as further including a pressure relief valve 77 attached to one end of a discharge pipe (no numeral). The discharge pipe is provided with a carbon canister 78. The discharge pipe is branched to the intake manifold 220 of the engine 206 through a pipe line 76 having a valve (no numeral) which is opened by the intake manifold vacuum. Designated by reference numeral 69 is a flow shut-off valve which is operative to cut off the flow of the vaporized fluid through the pipeline 68 when desired.

The Wankel type rotary engine 206 shown in FIG. 15 is of the character which operates on a liquefied petroleum gas. The liquefied petroleum gas is stored in an LPG tank 228 and is supplied to the engine carburetor 218 through a fuel filter 230, a flow shut-off valve 232 and an evaporator 234. The exhaust cleaning system for use with the rotary engine 206 of this type is constructed similarly to the system illustrated in FIG. 12 and thus includes a pipeline 236 leading from the evaporator 234. The pipeline 236 is connected to a flow control unit 238 through a fuel feed pump 240. The flow control unit 238 is connected on its discharge side to the exhaust system 222 upstream of the reducing catalyst means 28 through a valved pipeline 242. The control unit 238 is adapted to regulate the rate of flow of the evaporated fuel gas to be supplied to the exhaust system 222 from the evaporator 234 depending upon the driving conditions of the engine 206. Thus, the flow control unit 238 may be constructed similarly to the flow regulator valve forming part of the exhaust cleaning system of FIG. 9 or 12, in which instance the control unit 238 is operated by a solenoid device (not shown) which is actuated from a modulator arrangement 244 through an electric line 246. The modulator arrangement 244 is adapted to be responsive to the vacuum in the engine carburetor 218 through a vacuum passage 248.

It will now be appreciated from the above description that the method and system according to the present invention are useful for the purpose of minimizing or even elminating the toxic compounds in the motor vehicle exhaust gases in a simple construction which can be readily incorporated in the exhaust system of the motor vehicle engine of any type. Such method and system are therefore expected to significantly contribute to resolution of the vehicular air contamination problems.

The various embodiments of the system according to the present invention as herein described and shown should be interpreted as being solely for illustrative purposes and, as such, numerous modifications may be resorted to such embodiments where desired and depending upon the types of the engines which the exhaust cleaning systems are to be combined.

What is claimed is:

1. A combination with a motor vehicle engine which is adapted to be operated on an air-fuel mixture proportioned to an air-to-fuel ratio in a range between a stoichiometric air-to-fuel ratio and a value appreciably higher than the stoichiometric air-to-fuel ratio, of an exhaust cleaning system which comprises reducing an oxidizing catalyst means which are incorporated in an exhaust system of said engine, said oxidizing catalyst means being located posterior to said reducing catalyst means, reducing agent supply means for supplying a reducing agent to said exhaust system upstream of said reducing catalyst means for removing an excess of oxygen and reducing nitrogen oxides in the exhaust gases passed through said reducing catalyst means, said reducing agent supply means including fuel storage means receiving a fuel from a fuel tank of said engine, and fuel evaporator means for evaporating the fuel delivered from said fuel storage means and feeding the resultant evaporated fuel to said exhaust system upstream of said reducing catalyst means, said fuel evaporator means including a fuel evaporating chamber having an inlet communicating with said fuel storage means and an outlet communicating with said exhaust system upstream of said reducing catalyst means and a heating chamber which is in contact with said fuel evaporating chamber and which has an inlet and outlet communicating respectively with said exhaust system upstream and downstream of an outlet of a pipeline leading from the outlet of said fuel evaporating chamber for heating and evaporating the liquid fuel in said fuel evaporating chamber by transfer of heat to said fuel evaporating chamber from the hot exhaust gases circulated through said heating chamber, and secondary air supply means for supplying secondary air to the exhaust system intervening between said reducing and oxidizing catalyst means for oxidizing carbon monoxide and hydrocarbons in the exhaust system passed through the oxidizing catalyst means.

2. A combination with a motor vehicle engine which is adapted to be operated on an air-fuel mixture proportioned to an air-to-fuel ratio in a range between a stoichiometric air-to-fuel ratio and a value appreciably higher than the stoichiometric air-to-fuel ratio, of an exhaust cleaning system which comprises reducing and oxidizing catalyst means which are incorporated in an exhaust system of said engine, said oxidizing catalyst means being located posterior to said reducing catalyst means, reducing agent supply means for supplying a reducing agent to said exhaust sytem upstream of said reducing catalyst means for removing an excess of oxygen and reducing nitrogen oxides in the exhaust gases passed through said reducing catalyst means, said reducing agent supply means including fuel storage means receiving a fuel from a fuel tank of said engine and fuel evaporator means for evaporating the fuel delivered from said fuel storage means and feeding the resultant evaporated fuel to said exhaust system upstream of said reducing catalyst means, said fuel evaporator means including a pipeline leading from the exhaust system for feeding the hot exhaust gases into the liquid fuel in said fuel storage means for evaporating the fuel by a vapor pressure thereof, and secondary air supply means for supplying secondary air to the exhaust system intervening between said reducing and oxidizing catalyst means for oxidizing carbon monoxide and hydrocarbons in the exhaust system passed through the oxidizing catalyst means.

3. A combination with a motor vehicle engine which is adapted to be operated on an air-fuel mixture proportioned to an air-to-fuel ratio in a range between a stoichiometric air-to-fuel ratio and a value appreciably higher than the stoichiometric air-to-fuel ratio, of an exhaust cleaning system which comprises reducing and oxidizing catalyst means which are incorporated in an exhaust system of said engine, said oxidizing catalyst means being located posterior to said reducing catalyst means, reducing agent supply means for supplying a reducing agent to said exhaust system upstream of said reducing catalyst means for removing an excess of oxygen and reducing nitrogen oxides in the exhaust gases passed through said reducing catalyst means, said reducing agent supply means including a source of liquefied petroleum gas, evaporator means for evaporating the liquefied petroleum gas from said source, pumping means for delivering the resultant evaporated petroleum gas to the exhaust system upstream of said reducing catalyst means, and a flow control valve intervening between said pumping means and said exhaust system for controlling the rate of flow of the evaporated petroleum gas to be passed to the exhaust system in accordance with driving conditions of the engine, and secondary air supply means for supplying secondary air to the exhaust system intervening between said reducing and oxidizing catalyst means for oxidizing carbon monoxide and hydrocarbons in the exhaust system passed through the oxidizing catalyst means.

* * * * *